United States Patent [19]

Ricks

[11] Patent Number: 4,907,250

[45] Date of Patent: Mar. 6, 1990

[54] METHOD AND APPARATUS FOR COUNTING EVENTS IN A VENDING MACHINE AND THE LIKE

[76] Inventor: Jeffery D. Ricks, P.O. Box 231, Ucon, Id. 83454

[21] Appl. No.: 144,871

[22] Filed: Jan. 15, 1988

[51] Int. Cl.[4] .......................... G07F 9/00; G06F 7/00; H04Q 9/00

[52] U.S. Cl. .......................................... 377/7; 377/16; 364/479; 340/825.35; 235/381; 194/217; 194/218

[58] Field of Search .............................. 377/7, 13–16, 377/53, 54, 37; 340/825.54, 825.55, 825.35, 825.34; 364/479; 235/375, 379, 381; 194/217, 218

[56] References Cited

U.S. PATENT DOCUMENTS

| | | | |
|---|---|---|---|
| 3,112,395 | 11/1963 | Lien | 377/52 |
| 3,855,454 | 12/1974 | Eisen et al. | 377/52 |
| 4,120,452 | 10/1978 | Kimura et al. | 364/479 |
| 4,216,461 | 8/1980 | Werth et al. | 377/7 |
| 4,231,105 | 10/1980 | Schuller et al. | 194/217 |
| 4,329,684 | 5/1982 | Monteath et al. | 340/707 |
| 4,350,238 | 9/1982 | Shah et al. | 194/1 N |
| 4,369,442 | 1/1983 | Werth et al. | 340/825.35 |
| 4,376,479 | 3/1983 | Sugimoto et al. | 194/1 N |
| 4,423,319 | 12/1983 | Jacobsen | 235/381 |
| 4,512,453 | 4/1985 | Schuller et al. | 194/1 N |
| 4,558,318 | 12/1985 | Katz et al. | 340/825.35 |
| 4,591,704 | 5/1986 | Sherwood et al. | 235/381 |
| 4,611,205 | 9/1986 | Eglise | 340/825.35 |
| 4,639,875 | 1/1987 | Abraham et al. | 377/15 |
| 4,706,794 | 11/1987 | Awane et al. | 364/479 |
| 4,736,096 | 4/1988 | Ushikubo | 235/381 |
| 4,803,707 | 2/1989 | Cordan, Jr. | 377/26 |
| 4,823,928 | 4/1989 | Speas | 194/217 |

*Primary Examiner*—Stanley D. Miller

*Assistant Examiner*—Tai V. Duong

*Attorney, Agent, or Firm*—Hopkins French Crockett Springer & Hoopes

[57] ABSTRACT

A vending machine, coin-operated self-service machine, utility meter etc., is provided with a counting mechanism which is inexpensive and simple in construction and easy to operate. The device comprises a binary counting device capable of storing cumulative counts of transaction information. The binary counts are converted in a parallel to serial converter and ultimately pulsed in a series of long and short pulses to an LED. The vending machine, self-service machine, etc., is provided with a bar code serial number, and a bar code reader reads and stores both the serial number and the transaction information delivered through the LED. Software is provided to permit the storage of transaction count information based upon the serial number of a particular machine.

10 Claims, 4 Drawing Sheets

METHOD AND APPARATUS FOR COUNTING EVENTS IN A VENDING MACHINE AND THE LIKE

BACKGROUND OF THE INVENTION

This invention relates to method and apparatus for counting transaction information, storing the information and subsequent retrieval of the stored information. In a preferred embodiment, the invention is useful to count coin-activated cycles in, e.g., vending machines, coin-operated clothes washers and driers, etc.

There are a number of commercial environments in which the counting, storage and retrieval of transaction information is desirable. As used throughout this application, the words "transaction information" or "transaction count information" refer to the periodic counting of events, or transactions, such that a later audit will reveal the proper number of such transactions (and, therefore, the proper charge for such transactions), whether it be in the nature of a coin-operated vending machine, a coin-operated self-service washing machine, a utility meter, etc.

Various apparatus have been proposed for the purpose of providing a running total count of transactions and/or monies received in vending machines. The purpose, of course, is to assure the vending machine owner that the machine is functioning properly and that the correct amount of money is being reported based upon the number of transactions indicated. However, most of the devices heretofore proposed are relatively complex, and therefore quite expensive, and have not met with widespread commercial success. According to U.S. Pat. No. 4,376,479, a total sales indication device is provided which includes a cumulative total sales counter, an indication control switch and a control circuit for indicating total sales on the sales counter. An indicator which indicates either total amount deposited or balance due on an electrically-powered vending machine is adapted to perform the function of the disclosed invention.

A substantially more complex device is disclosed in U.S. Pat. No. 4,369,442. A device is provided for a vending machine which monitors, tests, audits and controls the vending machine. The device registers coin transactions, inventory control, product and price changes, service and transaction time checks, dispensing, temperature control, etc. The device includes a portable collection unit in the form of a micro-processor which accesses and communicates with the counter memory. The portable collection unit also inputs data into the vending machine and performs diagnostic operations thereon. The portable collection unit is connected to an input/output either by a plug-in or by an optical coupling. With an optical coupling, entry of a bar code into the registers is possible.

U.S. Pat. No. 4,611,205 discloses a system for collecting data from, e.g., vending machines, relating to operation of the machine and transfers the data to a storage module which is removed and down loaded at a central location to provide a transaction record. Similarly, U.S. Pat. No. 4,512,453 discloses an accountability system for a vending machine which stores information on the money deposited, change made and net deposits. A logic circuit controls input of data to and retrieval of data from the memory and access thereto is limited to persons possessing specially coded keys. Similarly, U.S. Pat. No. 4,450,238 discloses a data acquisition unit for a vending machine which stores number of vends of each product as well as price data. The data acquisition unit is connectable to the control device of a vending machine and transfers data to a data-accepting unit.

Lastly, U.S. Pat. No. 4,329,684 discloses an electronic control system for a television receiver which includes a light pen capable of sensing selectively either a bar code or the output of a digitally modulated light emitting device. Means are provided to interpret the output of the light sensor so as to distinguish between output received when reading a bar code as opposed to the output received when reading a digitally modulated light emitting device.

As can be readily seen, when applied to a vending machine-type environment, the devices noted above comprise complex electronic circuitry which in most cases is expensive to manufacture, difficult to maintain properly, and because of the complex nature of the circuitry and information exchange, poses the possibility of faulty information being stored under a number of circumstances such as power surges, power outages, etc. Programmable vending machines, or vending machines equipped with two-way communication systems, make up a tiny fraction of the vending machines currently in use because of their high initial cost and maintenance requirements. Only a minority of the most sophisticated, high use (therefore high volume) machines, such as soft drink or cigarette machines, could justify such expense. It is neither economical nor desirable to provide such circuitry on the large majority of vending machines, or other coin-operated machines. For instance, no sophisticated electronic programming is necessary for the proper functioning of a coin-operated clothes washing machine. After depositing the requisite fee, the customer is permitted to set the machine as he/she desires. Therefore, a mere counting mechanism to indicate the amount of money deposited and the number of wash cycles experienced, may be sufficient. Likewise, many simple vending machines, especially those without electrical power (such as the modern-day equivalent of the old-fashioned gumball machines) require only a mechanism to indicate the number of transactions made and money received. In non-vending machine environments, such as utility meters, automatic car washes, parking meters, toll booths, etc., expensive and sensitive control and counting mechanisms may not be desirable or cost-effective.

SUMMARY OF THE INVENTION

It has been estimated that as much as 20% of all vending machine receipts are skimmed or stolen from machine owners by unscrupulous route men. Additionally, a significant, but smaller, drain on machine income are "free vends" effected by the route men or service men who manually trips the dispense mechanism in order to receive free products or services.

The present invention includes a method and apparatus for storing, converting, retrieving and transmitting transaction count information (such as money received or units sold) from a vending machine, coin operated self-service machine, etc. The apparatus includes a counting switch which produces binary count information in response to stimuli, such as the deposit of a coin or the rotation of a utility meter wheel. Storage means are provided for storing the binary count information for later retrieval. A parallel to serial converting means, which converts parallel binary count information to serial binary count information, is provided as well as means to convert the serial binary count information to optical pulses for display in an LED. Information is retrieved from the present invention with e.g., a bar code reader, which can be adapted to read not only the stored count from the LED, but also a machine serial number with which the stored count information is correlated. Software is provided in a portable computer to store the information from the bar code reader, which can be stored either in a scrambled or unscrambled condition.

The stored binary transaction information is converted to electrical pulses, such that a binary count of "0" is converted to a short pulse and a binary count of "1" is converted to a long pulse. These pulses are thereafter directed to means which set the pulse for the LED. The invention preferably operates on a 5 volt power system, which may be provided either from electric service to the vending machine or a replaceable battery.

Each individual machine or transaction counter can be provided with a serial number, preferably in the form of a bar code indicia, which can likewise be read by the bar code reader in order to assimilate the information read with the proper machine.

DETAILED DESCRIPTION OF THE INVENTION

Figure 1:
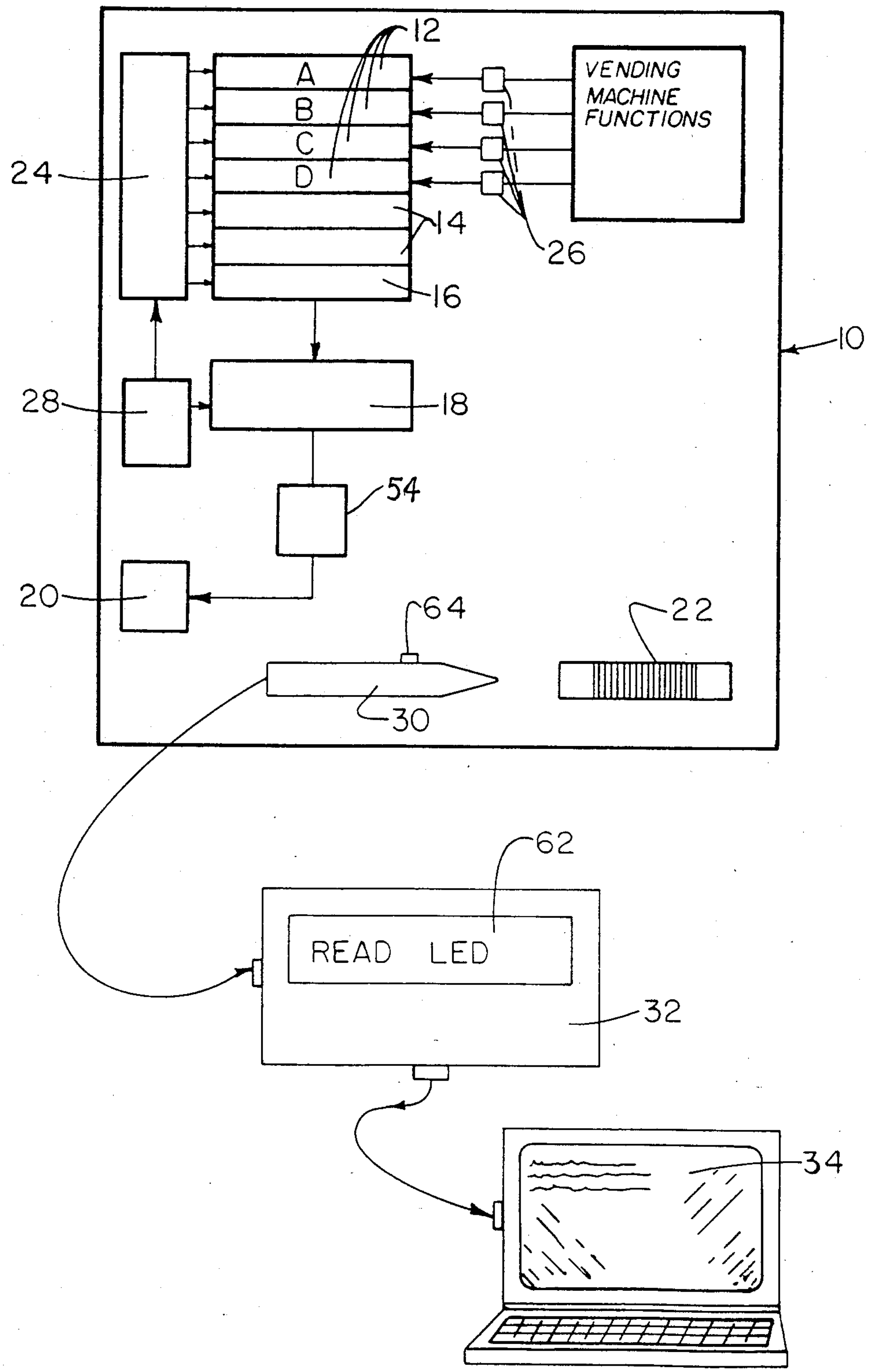
FIG. 1 is a block diagram illustrating the environment of a preferred embodiment of the present invention.

Referring first to FIG. 1, the operation of a typical vending machine will be briefly described. It is to be understood that while the following description relates primarily to the environment of a coin-operated vending machine, the principles of the present invention are equally susceptible for use in other environments, such as coin-operated self-service washing machines, electric utility meters, rate-of-flow monitors for oil wells, counting rate of manufacturing production on an assembly line, toll booths, car washes, etc. While there is no provision for discriminating between denominations of coins deposited in the embodiments illustrated in the drawings, such apparatus could easily be provided by one of ordinary skill in the art using readily available technology. As shown, the vending machine is primarily useful in counting coins deposited in a single-denomination vending unit, such as the machines used in the vending of one-coin units or multiple same-coin vends, such as clothes washing machines.

As shown in FIG. 1 a vending machine is provided with a counting mechanism 10 which comprises therein a plurality of counters 12, a security code register 14, an application code register 16, a parallel to serial converter 24, and an optical output in the form of a light-emitting diode (LED) 20. The vending machine is provided with a bar code label 22, which distinguishes the particular vending machine from all other machines serviced by the route man. The bar code label is easily configured to indicate the serial number or other identifying indicia of the particular machine. Register selector 18 is provided to read each of the counters 12, application code registers 16 and security code registers 14 in sequence.

The vending machine's functions (such as the deposit of coins into a coin slot) activate switches 26 used to advance the count stored in the counters. The switches 26 may be of any convenient method of manufacture, such as normally-open or normally-closed mechanical or magnetic switches. It is to be understood that the term "switch" is to be used broadly, so that any means whereby a sequential count can be generated may be utilized herein as a switch. The deposit of a single coin will cause one of the switches 26 to close once, thereby advancing the count in the corresponding counter 12 by a value of 1. The counter is preferably a 16 bit counter of conventional manufacture. The maximum number of counts available in a 16 bit counter before rolling over is 65,536; if higher counts are necessary prior to removal of the stored data, a binary counter with greater bit capacity can be utilized. The counter 12 utilized herein merely stores the cumulative count in binary format.

The read enable switch 28 activates the register selector 18 and parallel to serial converter 24. The register selector 18 selects one of the registers 12, 14 or 16. The parallel to serial converter 24 takes each of the 16 bits of the selected register one at a time and converts its digital value to an electrical pulse, which in turn is converted by the LED 20 to an optical pulse. The optical pulses can be read by a conventional bar code reader 30, with the data being fed to a portable computer 32. Prior to a serviceman operating the reader 30 to read the optical pulses from the LED 20, the bar code reader 30 will be directed to read the bar code label 22 (containing a machine's serial number) from the particular machine, so that the data read from the LED 20 will be stored under the proper serial number. Software in the portable computer 32 enables the bar code reader 30 to alternately read bar code labels and the optical pulses from the LED.

In the preferred embodiment, the portable computer 32 does not manipulate the data fed to it by the bar code reader 30. Rather, the portable computer 32 merely stores the data which is later downloaded to a host computer 34. In this manner, the individual servicing the particular vending machine (such as a route man removing money and replenishing stock) is not provided with the capability of altering the data stored in the counting means in order to effect a fraud on the machine owner.

As shown in FIG. 1, four discrete counting means 12 (individually labelled A, B, C and D) can be provided to monitor four functions of the particular machine. For instance, in the embodiment of a coin-operated clothes washing machine, counter A might indicate the number of times the coin slide is actuated, counter B might indicate the number of actual machine cycles, counter C might indicate the number of times the service door on the machine has been opened, and counter D might indicate the number of times the coin box has been removed for coin collection. If it is desired to monitor more than four functions on a particular machine environment, additional counters 12 can be added.

The security code register 14 may take any convenient form that results in electronically isolating one group of machines from another group of machines, each group possessing its own individualized distinguishing indicia 22. For instance, owner X may have a vend route in the same geographic area as owner Y, both routes being affixed with the counting means disclosed herein. In order to prevent a route man who services machines owned by owner X from reading the transaction information stored in his competitor's machines, owner Y may choose to install a counting mechanism 10 encoded with a security code in security code register 14, so that only a bar code reader or portable computer having the appropriately encoded software will be able to access such transaction information. Unless the software of the portable computer 32 contains the appropriate security code, the bar code reader 30 cannot transfer the transaction information stored in the counting means to the portable computer.

Figure 2A:
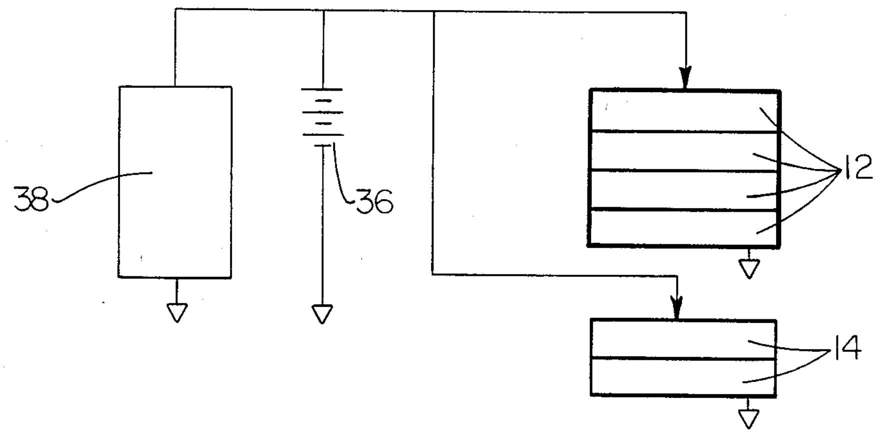
FIGS. 2-A, B and C are block diagrams of the security code and application code.
Figure 2B:
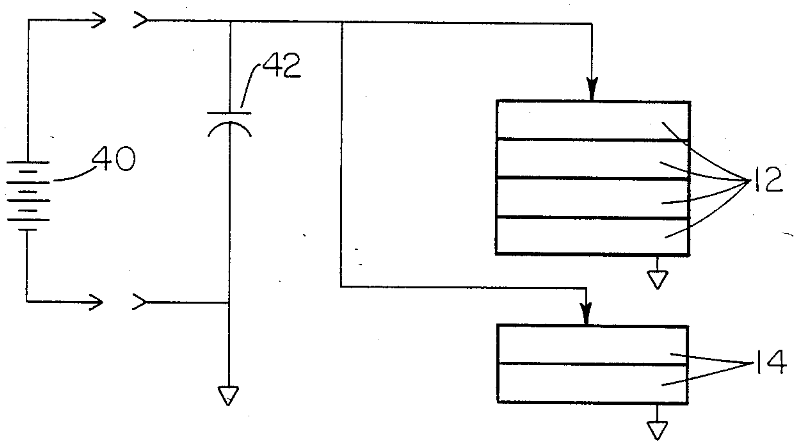
Figure 2C:
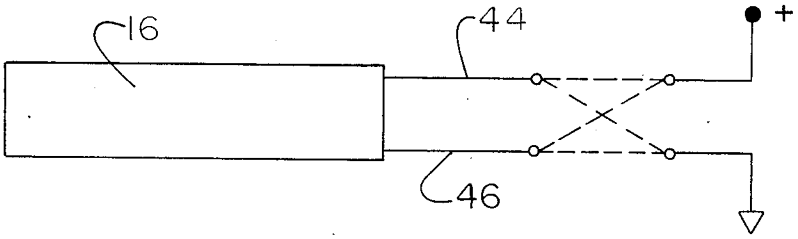

Referring now to FIG. 2-A, the security code register 14 is capable of maintaining the code as long as its circuitry is provided with power, so that a long life lithium battery 36 is used as back-up power when primary power 38 (typically AC power) is disrupted. Because of the minimal and infrequent power demands of the present invention, the present invention may be powered by batteries 36 when a primary AC power supply is inaccessible.

In some applications of the present invention a security code may not be needed. For instance, if used in certain candy/gumball-type vending machines, a key-locked door must be opened in order to access the LED 20 to retrieve the stored transaction data. Each route owner would typically have a unique key for his route. A security code and therefore security code register 14 would not be needed, thereby eliminating the need for back-up battery 36 to maintain the code.

Referring now to FIG. 2-B, since most gumball-type vending machines do not run on AC power, the primary power source is preferably a replaceable battery 40. Storage capacitor 42 is used to maintain power to the counters 12 and the security code register 14. However, while the battery is being changed the possibility exists (although very unlikely) that the counter data and security code may be lost if the capacitor loses its charge before the battery is replaced, causing random values to be placed in the counters 12. In this event the counters could still be subsequently used by determining the count from after the power disruption. However, the security code would thereafter be permanently altered, rendering the counter data inaccessible. If this should occur, the portable computer 32 would be re-programmed to ignore the security code, thereby making the data in the counters accessible. Because the security code was overridden, the reader 30 would be enabled to access the stored transaction data, even if in another application. To prevent this, an application code register 16 is used. Referring to FIG. 2-C, the application code is "hard wired" into the application code register 16 so that the code is retained whether power to the circuitry is maintained or not. Pins 44 and 46 can be tied to ground or positive, making possible four different combinations or four different application codes. Those applications requiring a security code may have both pins tied to positive. Those applications not requiring a security code may have both pins tied to ground. The reader 30 and portable computer 32, if used in an environment not requiring a security code, could only access data if the application code register had both pins tied to ground. This would prevent the reader from accessing data in security coded counters.

Figure 3:
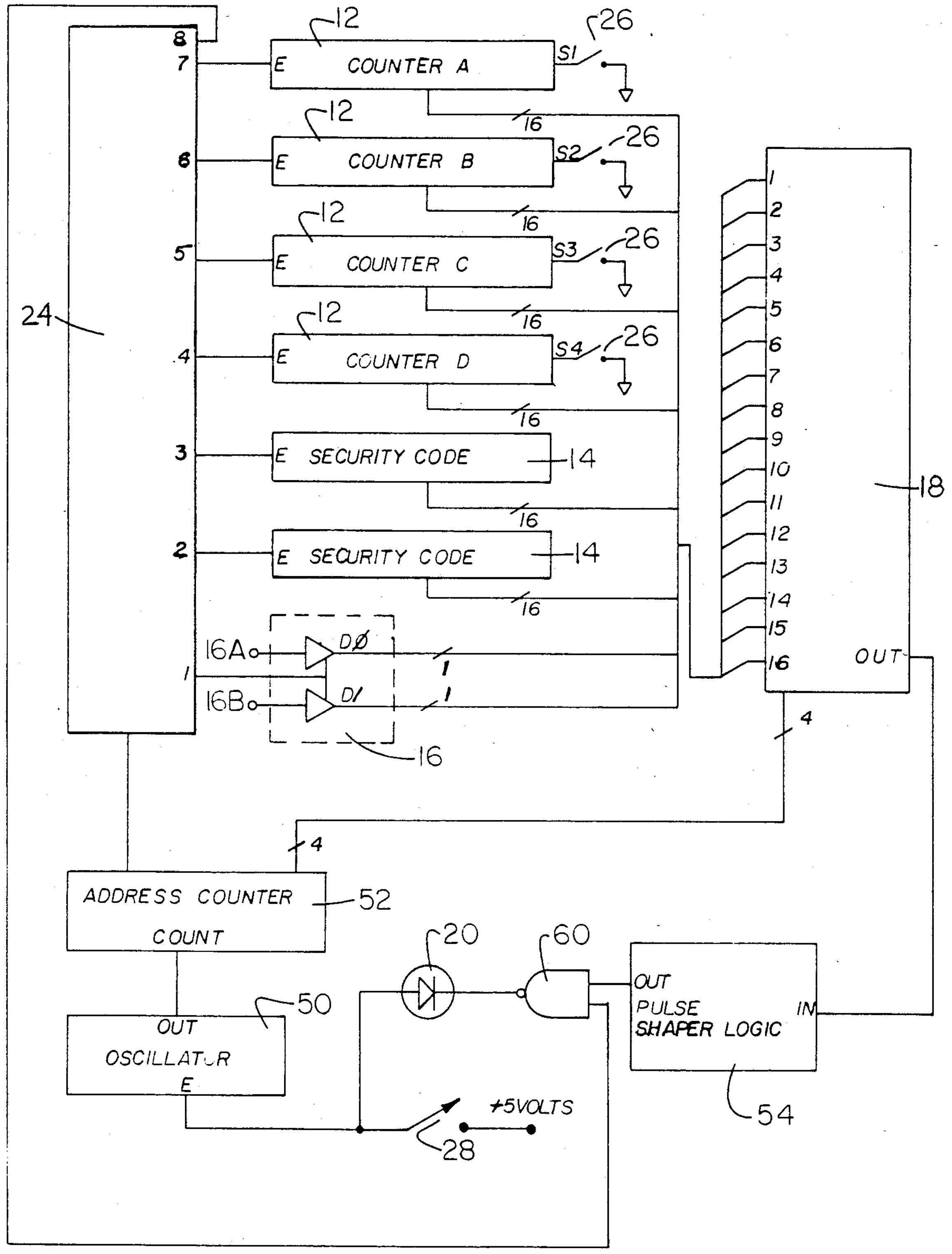
FIG. 3 is a block diagram of the circuitry of a preferred embodiment of the present invention.

Referring now to FIG. 3, an input from one of the vending machine functions activates one of the switches 26 and advances its corresponding counter 12 by one count. The security code registers 14 consist of two 16 bit shift registers. The security code is shifted into the registers and is maintained as long as power to the circuitry is maintained.

The application code register 16 consists of two buffers. Inputs (16A and 16B) "hard wired" to either ground or positive create the application code.

The data in the registers 14 is read by activating the enable switch 28, turning on the oscillator 50 and LED 20. The oscillator 50 causes the address counter 52 to address each bit of each register 12, 14 and 16 one at a time using the register selector 18 and parallel to serial converter 24. As each bit is addressed its value (either 1 or 0) is passed to the pulse shaper 54, which generates an electronic pulse of one unit width for a bit value of 0 and two unit widths for a bit value of 1. The pulse is then passed to the LED 20, converting the electronic pulse to an optical pulse which can be read by the bar code reader 30. When all the bits have been passed to the LED 20, the cycle is repeated, for so long as the enable switch 28 is activated.

Once during each read cycle a calibration pulse is generated which disables the LED for a period of time equal to the time it takes to address each bit of one register. Software in the portable computer 32 reads the width of this calibration pulse and adjusts its internal parameters accordingly, in order to obtain an error-free reading from the data in the registers 12, 14 and 16. In a preferred embodiment, the calibration pulse is generated when the number 8 output of the register 18 goes "HI", disabling the NAND gate 60 and thereby disabling the LED 20.

The portable computer 32 contains an internal clock which tracks date and time. Upon retrieval of transaction count information, the computer 32 affixes the date and time of such retrieval to the information retrieved. For ease of operation, the portable computer 32 has no keyboard but includes a small prompt screen 62 to indicate to the user of the device what to do next (such as "READ BAR CODE SERIAL NUMBER" or "READ LED"). The bar code reader 30 includes a switch 64, which when depressed powers the portable computer. The computer then leads the user through a sequence by displaying messages on the screen 62. When the sequence is complete the computer turns itself off so as not to drain power from its internal batteries when not being used.

The timing diagram (FIG. 4) illustrates the format for data transmission to the LED. Because the data transmission frequency can vary slightly (a relatively small frequency variation is sufficient to render the data incorrect or unintelligible) due to temperature variation of the components in the counter, a calibration pulse 64 is used. The calibration pulse may vary with each transmission and is measured by the software in the portable computer to establish a baseline from which the transaction count information, which follows, is measured The computer 32 then adjusts its parameters for determining if a data pulse 66, 68 has a binary value of 1 or binary value of 0.

Figure 4:
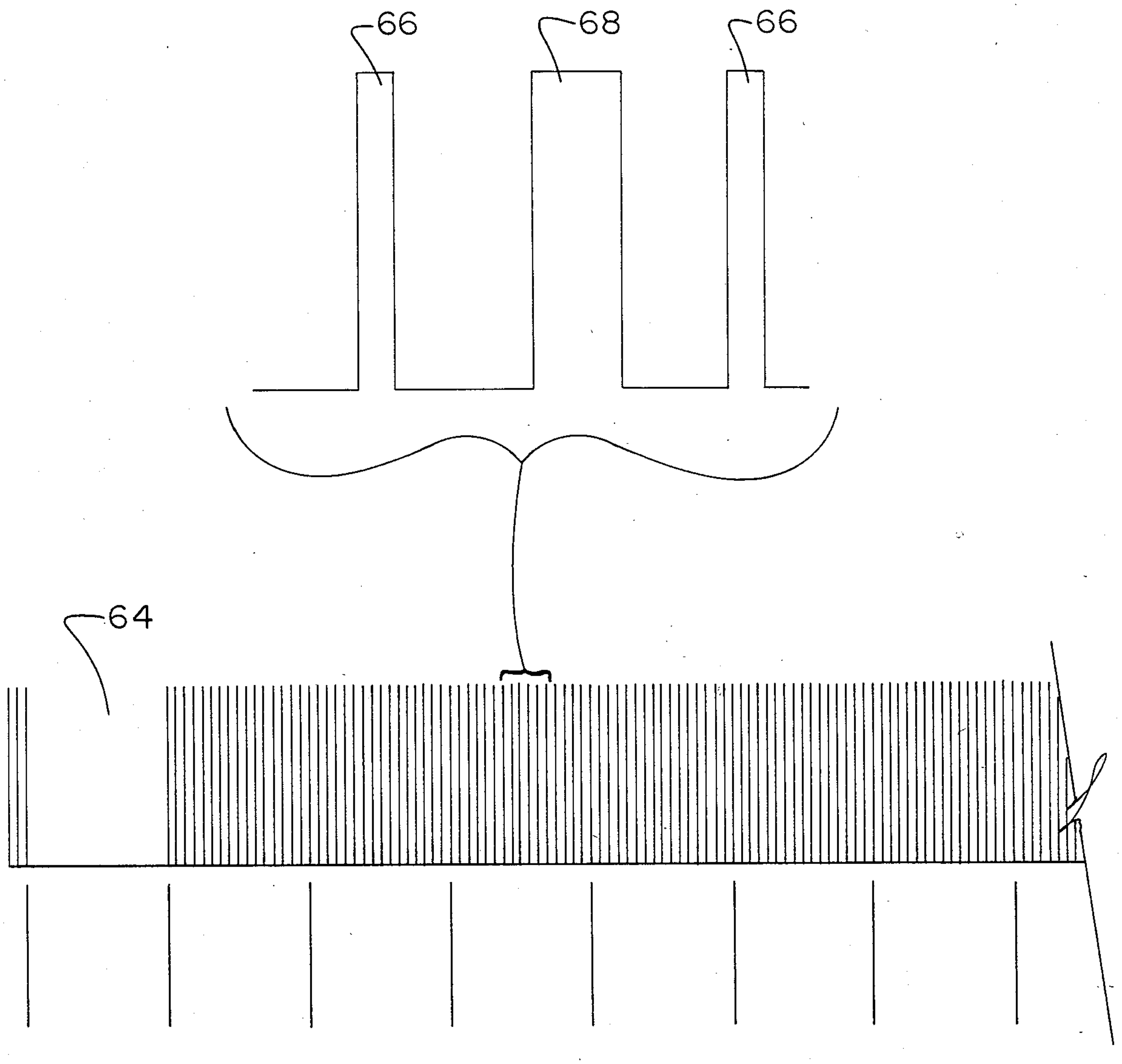
FIG. 4 is a schematic representation of a timing diagram for transmitting data within the present invention.

The representation of FIG. 4 indicates typical data transmission from the counter circuitry to the portable computer wherein pulses 66 indicate a binary value of 0 and pulse 68 indicates a binary value of 1. Applicant has found it convenient to set the timing such that a binary 0 data pulse width is ½ clock cycle in width while a binary 1 data pulse width is 1 clock cycle in width. For reference purposes, the calibration pulse 64 may be 32 clock cycles in width. While the frequency of the clock may vary with temperature, applicant has found it preferable to set one clock cycle equal to 1.0 millisecond.

When reading the transaction count information from a machine, switch 28 is closed, thereby activating the present invention to produce optical pulses in LED 20. Software in the portable computer is provided which enables the bar code reader or wand 30 to alternately read the bar code serial number 22 of the machine and the output of LED 20. Bar code readers such as that proposed for use in the present invention produce a light beam, typically in the infra-red spectrum, which is reflected back by the bar code and assimilated by, for instance, a portable computer to indicate letters or numerals. Software incorporated into the present invention permits the bar code reader to alternately read reflection of internally generated light (as from bar code), and the pulsed light from LED 20. The light intensity from LED 20 must be sufficient to "overpower" the internally generated light from the bar code reader, so that the bar code reader 30 will preferentially read the pulsed light from LED 20 rather than any reflection which might occur from internally generated light. Obviously, the wave length of the light emanating from the LED must be within the wave lengths which the bar code reader will read (typically within the infrared spectrum).

It has been found preferable to provide software in the portable computer which will immediately scramble the data being input from the vending machine so as to preserve its confidentiality and prevent tampering by unauthorized personnel. After data has been collected from a number of machines, it may be transferred to a home, or mother, computer 34, either by direct data link or over telephone lines. The mother computer must also have the same security code in its software as is in the counters and portable computer or data will not transfer.

Software in the portable computer can be configured so as to perform a number of ancillary services unrelated to the actual counting of money or transactions. For instance, a parts inventory list could be provided, with each part having a bar code identifying number, so that when reading the count from a particular machine, a route person could indicate parts needed by simply moving the bar code reader over the appropriate parts identifier. Numerous other functions may be programmed, such as using the computer as a time clock by logging on and off the hours worked by the route man (using the computer's internal clock provided for tracking date and time of data collection).

Data received by the home computer is descrambled and processed to provide a route owner with information about each of the individual machines.

While the invention described herein has been described and illustrated with regard to specific embodiments, it should be appreciated that numerous modifications and substitutions can be made to this disclosure without departing from the spirit and scope of the invention. Accordingly, the scope of the present invention should be determined solely by the appended claims.

I claim:

1. Apparatus for storing, converting, retrieving and transmitting stored transaction count information generated by counting means, said apparatus comprising:

a. at least one switch for producing binary count information responsive to input stimuli said switch selected from the group consisting essentially of normally open and normally-closed mechanical and magnetic switches, which is activated by a periodic transaction;

b. a plurality of counting means for receiving and storing binary count information generated by said at least one switch of step a.;

c. parallel to serial converting means to convert parallel binary count information stored in the counting means of step b. to serial binary count information, said parallel to serial converting means being activated upon manual actuation of an enable switch and an oscillator means;

d. means to convert the serial binary count information of step c. to electrically-generated optical pulses for display in an LED;

e. optical retrieval means for reading the optical pulses displayed in the LED of step d.; and f. transmitting means for transmitting optical pulses retrieved in step e. to a computer, such that the stored transaction count information is stored according to the identifying indicia of each counting means.

2. The apparatus as recited in claim 1, wherein said counting means is incorporated with said at least one switch into an integrated circuit.

3. The apparatus as recited in claim 1, wherein the parallel to serial converting means sets a pulse width based upon the binary count, such that a binary bit value of "0" is converted to a short electrical pulse of one unit width and a binary bit value of "1" is converted to a long electrical pulse of two unit widths.

4. Apparatus for storing, converting, retrieving and transmitting stored transaction count information generated by counting means in the form of a mechanical coin counter affixed to a coin-operated self-service machine and correlating said information with identifying indicia of said counting means, comprising the steps of:

a. producing a binary count running total responsive to input stimuli, and storing the binary count;

b. converting the binary count of step a. from parallel to serial binary count;

c. setting a pulse width based upon the binary count, such that a binary bit value of "0" is converted to a short electrical pulse of one unit width and a binary bit value of "1" is converted to long electrical pulse of two unit widths.

d. converting the serial binary count of step b. to electrically generated optical pulses for display in an LED;

e. retrieving the stored transaction count information from the LED of step c. in the form of optical pulses; and f. transmitting the optical pulses of step d. and identifying indicia to a computer, such that the transaction count information is stored according to the identifying indicia of each counting means.

5. The method of claim 4, further comprising charging the LED with said short and long electrical pulses, to produce short and long optical pulses.

6. The method of claim 4, further comprising transferring information from the electronic light sensor to a computer, said computer enabling the sensor to alternately read bar code labels and optical pulses from the LED.

7. Apparatus for storing, converting, retrieving and transmitting stored transaction count information generated by counting means, said apparatus comprising:

a. at least one switch for producing binary count information responsive to input stimuli said switch selected from the group consisting essentially of normally open and normally-closed mechanical and magnetic switches, which is activated by a periodic transaction;

b. a plurality of counting means for receiving and storing binary count information generated by said at least one switch of step a.;

c. parallel to serial converting means to convert parallel binary count information stored in the counting means of step b. to serial binary count information, said parallel to serial converting means being activated upon manual actuation of an enable switch and an oscillator means;

d. means to convert the serial binary count information of step c. to electrically-generated optical pulses for display in an LED;

e. optical retrieval means for reading the optical pulses displayed in the LED of step d.;

f. transmitting means for transmitting optical pulses retrieved in step e. to a computer, such that the stored transaction count information is stored according to the identifying indicia of each counting means; and g. optical retrieval means being provided in the form of an electronic light sensor adapted to read and assimilate identifying indicia of the counting means and to read optical pulses from the LED, and to communicate with a computer program associated therewith which permits the sensor to alternately read identifying indicia of the counting means and optical pulses from the LED.

8. The apparatus as recited in claim 7, wherein the information transferred from the electronic light sensor to the computer program is scrambled to prevent unauthorized entry thereinto.

9. A method of storing, converting, retrieving and transmitting stored transaction count information generated by counting means in the form of a mechanical coin counter affixed to a coin-operated self-service machine and correlating said information with identifying indicia of said counting means, comprising the steps of:

a. producing a binary count running total responsive to input stimuli, and storing the binary count;

b. converting the binary count of step a. from parallel to serial binary count;

c. converting the serial binary count of step b. to electrically generated optical pulses for display in an LED;

d. retrieving the stored transaction count information from the LED of step c. in the form of optical pulses;

e. transmitting the optical pulses of step d. and identifying indicia to a computer, such that the transaction count information is stored according to the identifying indicia of each counting means;

f. retrieving the optical pulse information and identifying indicia with an electronic light sensor, in the form of a bar code reader, and transferring information from the electronic light sensor to a computer, said computer enabling the sensor to alternately read bar code labels and optical pulses from the LED.

10. The method of claim 9, further comprising scrambling the information transferred from the electronic light sensor to the computer to prevent unauthorized entry thereinto.

* * * * *